(12) United States Patent
Gross et al.

(10) Patent No.: US 12,271,185 B2
(45) Date of Patent: Apr. 8, 2025

(54) METHOD FOR IDENTIFYING A PROCESS-DISRUPTING AUTOMATION COMPONENT IN A CONCATENATED AUTOMATION ASSEMBLY

(71) Applicant: Siemens Aktiengesellschaft, Munich (DE)

(72) Inventors: Ralf Gross, Nuremberg (DE);
Hans-Henning Klos, Weigendorf (DE);
Benjamin Kohler, Bodenwöhr (DE);
Vladimir Lavrik, Hessen (RU);
Wolfgang Riedl, Nuremberg (DE);
Jens Schnittger, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 17/908,831

(22) PCT Filed: Feb. 18, 2021

(86) PCT No.: PCT/EP2021/053956
§ 371 (c)(1),
(2) Date: Sep. 1, 2022

(87) PCT Pub. No.: WO2021/175604
PCT Pub. Date: Sep. 10, 2021

(65) Prior Publication Data
US 2023/0113323 A1 Apr. 13, 2023

(30) Foreign Application Priority Data
Mar. 6, 2020 (EP) .................................. 20161435

(51) Int. Cl.
*G05B 23/02* (2006.01)

(52) U.S. Cl.
CPC ..... *G05B 23/0275* (2013.01); *G05B 23/0262* (2013.01)

(58) Field of Classification Search
None
See application file for complete search history.

(56) References Cited

U.S. PATENT DOCUMENTS

| 2005/0075748 A1 | 4/2005 | Gartland et al. |
| 2007/0198752 A1* | 8/2007 | Danz .................. G05B 19/0423 710/8 |

(Continued)

FOREIGN PATENT DOCUMENTS

| CN | 101487865 | 7/2009 |
| CN | 101989087 | 3/2011 |

(Continued)

OTHER PUBLICATIONS

PCT International Search Report and Written Opinion of International Searching Authority mailed May 10, 2021 corresponding to PCT International Application No. PCT/EP2021/053956 filed Feb. 18, 2021.

*Primary Examiner* — David Earl Ogg
(74) *Attorney, Agent, or Firm* — Cozen O'Connor

(57) ABSTRACT

A method and an automation component for identifying a process-disrupting automation component in an industrial automation assembly, wherein a process disruption is determined in a first automation component and examined by a first local analysis device, where an automation component arranged upstream and/or an automation component arranged downstream is first determined by each automation component, an interrogation message is sent from a first automation component to a second automation component and the same interrogation message or a further interrogation message is recursively sent by the second automation component to a third automation component arranged (Continued)

upstream or downstream of the second automation component and processed, where in the event of a locally determined disruption, the relevant automation component sends a response message, which is back-propagated to the origin and signaled such that a decentralized error analysis becomes possible, even with a changing system topology, without the need for any redesign work.

10 Claims, 2 Drawing Sheets

(56) References Cited

U.S. PATENT DOCUMENTS

| | | | | |
|---|---|---|---|---|
| 2010/0168897 A1* | 7/2010 | August | ............... | G05B 19/042 |
| | | | | 700/111 |
| 2015/0316904 A1* | 11/2015 | Govindaraj | ........ | G05B 13/0205 |
| | | | | 700/28 |
| 2015/0316911 A1* | 11/2015 | Rischar | ................. | G05B 15/02 |
| | | | | 700/9 |

FOREIGN PATENT DOCUMENTS

| | | | | |
|---|---|---|---|---|
| CN | 102521378 | | 6/2012 | |
| CN | 107671887 | | 2/2018 | |
| CN | 109491304 | | 3/2019 | |
| CN | 110096394 | | 8/2019 | |
| CN | 116359635 | | 6/2023 | |
| CN | 117110778 | | 11/2023 | |
| DE | 10254009 | | 6/2004 | |
| EP | 2950176 A1 | * | 12/2015 | ......... G05B 19/0426 |
| WO | 2005093530 | | 10/2005 | |

\* cited by examiner

METHOD FOR IDENTIFYING A PROCESS-DISRUPTING AUTOMATION COMPONENT IN A CONCATENATED AUTOMATION ASSEMBLY

CROSS-REFERENCE TO RELATED APPLICATIONS

This is a U.S. national stage of application No. PCT/EP2021/053956 filed 18 Feb. 2021. Priority is claimed on European Application No. 20161435.1 filed 6 Mar. 2020, the content of which is incorporated herein by reference in its entirety.

BACKGROUND OF THE INVENTION

1. Field of the Invention

The invention relates to industrial automation systems and, more particularly, to an automation component and method for identifying a process-disrupting automation component in a concatenated automation assembly.

2. Field of the Invention

Modern industrial automation arrangements, in particular production plants (for example, filling plants in the drinks or food industry), manufacturing plants or process plants, are distinguished by a complex plant structure having a multiplicity of concatenated workstations or modules. The workstations or modules are usually controlled by a programmable logic controller. Such a station or module, together with its controller, is intended to be referred to as an automation component for short below.

In such plants, disruptions may arise at the production time at the throughput-limiting main assembly ("bottleneck", "bottleneck component", "bottleneck assembly"), the cause of which is not immediately obvious because it is not in the main assembly itself. This bottleneck assembly determines the efficiency of the entire plant. Stoppages at the bottleneck therefore result in a loss of efficiency. In order to make the components actually responsible for a loss of efficiency visible and therefore to be able to identify potential measures for increasing efficiency, a determination of the cause, a "root cause analysis" (RCA), of the entire plant is performed. Here, the causative disruption that resulted in the failure of the plant is determined. Performance of this analysis requires, on the one hand, general knowledge of the plant structure and, on the other hand, knowledge of the behavior of the existing components (for example, throughputs, switch-on/switch-off behavior). This general knowledge must be modeled and made available to an RCA for performance. On the other hand, the current state history of the automation components involved in the disruption to be analyzed in the main assembly, if available, is required. In the context of this RCA, an early warning (EW) analysis can also be preventatively performed. The aim of this "EW" analysis is to predict the time by which a component stoppage must be rectified so that it does not have a negative effect on the bottleneck. For this purpose, it is likewise necessary to model, generally manually, the plant structure and the component behavior.

Hitherto, a plant had to be initially digitally modeled, i.e., all machines (automation components consisting of the controller and the controlled mechatronic components) and the connections between them had to be created in a software tool, such as Tecnomatix Plant Simulation. In addition, all relevant key figures of all machines involved must be stored (for example output per minute, start-up times, idle times). This may mean a very considerable amount of data that are often not even specified by the machine manufacturer or cannot be specified at all because they are context-dependent (for example, depend on the product to be currently manufactured) and must be measured manually. On account of fluctuations which exist in reality, a certain vagueness (minimum/maximum values) must always be taken into account in modeling. Once the plant has finally been modeled, an RCA can be performed on an external computer that must be able to receive data from all machines. This is possible, for example, with a superordinate Supervisory Control and Data Acquisition (SCADA) system if the following prerequisites are met: 1. The created modeling of the plant is up-to-date both in terms of the structure and in terms of relevant key figures. 2. All relevant dynamic data are continuously available to the SCADA system, i.e., all reporting components/assemblies must continuously provide information in a suitable format.

WO 2005/093530 A2 to Danz et al. entitled "MODULAR MACHINE AND CORRESPONDING METHOD FOR DYNAMICALLY CONFIGURING THE TOPOLOGY OF SAID MACHINE" discloses a method for finding adjacent machines in a distributed topology for configuring communication relationships.

DE 102 54 009 A1 to Heinemann entitled "Method and data network for automatically configuring closed-loop and open-loop controllers of machine tools or production machines" describes an automatic configuration method for machines, where the machine topology is determined automatically.

There is a problem when an RCA is intended to be performed on an ad-hoc basis in a newly configured automation arrangement or in an automation arrangement that has not yet been completely modeled. There is a further problem when a plant is frequently reconfigured, in particular when alternately different products are intended to be produced.

SUMMARY OF THE INVENTION

In view of the foregoing, it is therefore an object of the invention is to provide a method that makes it possible to perform a determination of the cause of a fault, i.e., a root cause analysis (RCA), in a simple manner in an environment with a dynamic structure of an automation arrangement.

This and other objects and advantages are achieved in accordance with the invention by a method in which the RCA is performed directly on or in the automation components of the plant to be analyzed (automation arrangement). For this purpose, it is necessary for the plant structure to dynamically find itself and for the calculation of the RCA to occur in a decentralized manner on the concatenated machines (automation components and their controllers). The data (state information, configuration parameters for the analysis) relating to the respective components that are required for this purpose may be continuously updated for this purpose. In this regard, it is desirable for the complexity to be reduced for the user of the analysis by reducing the amount of configuration. In addition, the local processing of locally captured data reduces the demand imposed on the communication system of the automation arrangement and dispenses with the need for a superordinate execution and coordination unit for the analysis. The achievement of the object provides a method for identifying a process-disrupting automation component in an industrial automation arrangement having a plurality of concatenated automation components, where a process disruption is determined in a first of the automation components and is examined at this location by a first local analysis device. In this case, in a first step, each automation component determines at least one automation component arranged upstream in the concatenation and/or at least one automation component arranged downstream in the concatenation, in a second step, the first automation component sends an interrogation message to at least one second automation component that is arranged upstream or downstream in the concatenation depending on the type of process disruption, and, in a third step, a local analysis device of the second automation component takes locally stored or measured key figures as a basis for deciding whether this second automation component is the cause of the process disruption. If so, in a fourth step, a response message is then sent in this case to the first automation component, and, if not, in a fifth step, the same interrogation message or a further interrogation message is recursively sent by the second automation component to at least one third automation component arranged upstream or downstream of the second automation component and is analogously processed there, where, in a sixth step, a response message received by an automation component is respectively forwarded to that automation component from which the automation component receiving the response message received the associated interrogation message, and, where, in a seventh step, the first automation component definitively receiving the response message provides or outputs, based on the content of the response message, information relating to the automation component that is the cause of the process disruption. The method therefore forwards interrogation messages until an automation component that is the cause of the disruption returns a response message in the same way. This enables a decentralized fault analysis even with a changing plant topology without new project planning.

It is also an object of the invention to provide a system having a number of automation components configured to implement the method for operation in an industrial automation arrangement having a plurality of concatenated automation components, where the or each automation component has an analysis device, where the analysis device is configured to determine at least one automation component arranged upstream in the concatenation and/or at least one automation component arranged downstream in the concatenation, to send an interrogation message to at least one second automation component that is arranged upstream or downstream in the concatenation depending on the type of process disruption, and, if the analysis device receives an interrogation message, to take locally stored or measured key figures as a basis for deciding whether this automation component is the cause of the process disruption. If so, the automation component is intended to be configured in this case to send a response message to the interrogating automation component, and, if not, to forward the same interrogation message or a further interrogation message to at least one other automation component that is arranged upstream or downstream of it, and to respectively forward a received response message to that automation component from which the automation component received an associated interrogation message. If it was the original sender of the interrogation message, it is intended to provide or output, based on the content of the associated response message, information relating to the automation component of the automation components that is the cause of the process disruption. The use of automation components configured in such a manner can achieve the advantages already discussed with reference to the method in accordance with the invention.

An automation component of the automation components, the performance of which determines or limits the performance of the entire automation arrangement ("bottleneck"; "bottleneck component"; "BN"), is advantageously determined as the first automation component. This automation component can usually determine a disruption first and can therefore initiate the analysis process first. The selection as a first automation component can be manually performed by administration. Such a component advantageously determines itself, for example, on the basis of a type of machine (for example, filling assembly in the drinks industry). Another possibility is for an automation component or each automation component to interrogate the performance figures, for example, throughput per hour, of all automation components via an interrogation message forwarded in a token-based manner in the network and for that automation component of the automation components that has the lowest performance figure to be automatically selected. It is also possible for a plurality of bottleneck components to be defined in a plant network. It is also possible to stipulate, for example, that the last component "downstream" undertakes this role as a default value.

For simple structural analysis, in the first step, the automation component arranged upstream and/or the automation component arranged downstream can be determined based on data channels to adjacent automation components or based on material input interfaces and/or material output interfaces of this automation component.

Alternatively or additionally, in the first step, the automation component arranged upstream and/or the automation component arranged downstream can be determined based on a test body running through the automation arrangement. In this case, the test body can record the stations and therefore automation components through which it has run. It is also possible for the automation component to register the presence of the test body and to document it in each case with a time stamp. In the embodiment mentioned last, communication of the automation components is necessary in order to derive the topology. In the embodiment mentioned first, the information recorded by the test body must be ultimately provided in the network or transmitted to the automation components.

In the event of a branch in which a plurality of automation components are arranged upstream or downstream in the concatenation, a plurality of parallel interrogation messages are advantageously sent in the second step, where the corresponding plurality of response messages are combined to form a common response message in the automation component sending the parallel interrogation messages. Branched automation arrangements or networks can therefore also be analyzed.

If the interrogation message reaches a last one of the automation components in the concatenation, then this is responded to with a response message in the opposite direction of the concatenation.

If a cause of a process disruption can be foreseen for the future based on the local key figures, a local analysis device of one of the automation components advantageously sends an early warning message to at least one of the adjacent automation components. This is advantageously forwarded to the bottleneck component or another selected automation component and is published or otherwise processed by the latter.

The interrogation messages and the response messages each advantageously comprise a unique token at least in the event of branches. Alternatively or additionally, it is also possible to work with unique IDs (for example, of the first automation component) and/or time stamps. Time stamps also allow lost messages to be taken into account by means of timeout control.

If the topology of the industrial automation arrangement changes, then at least the first step is preferably re-performed on each of the automation components. This may also be provided for each restart of a plant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method in accordance with the invention is explained below with reference to the drawing. It is simultaneously used to explain an automation component in accordance with the invention, in which.

DETAILED DESCRIPTION OF THE EXEMPLARY EMBODIMENTS

Figure 1:
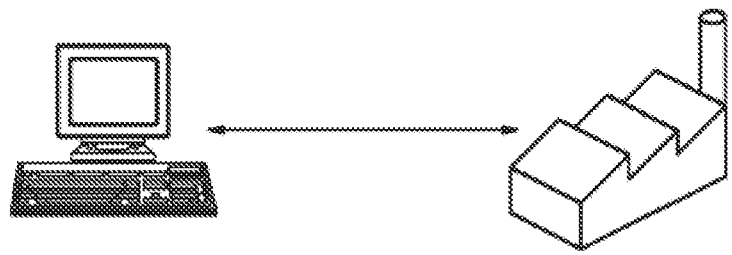
FIG. 1 shows the prior art with a central fault analysis.

FIG. 1 schematically shows a conventional fault analysis arrangement, where a computer for the fault analysis (on the left in the illustration) is connected to a data network of a distributed industrial automation arrangement (shown on the right in the image). In this case, the prior art provides for the computer to capture all state and operating information relating to the individual automation components (not individually illustrated) and, based on these data, to determine and output or report the cause of a disruption (via alarms, using HMI devices or the like).

Figure 2:
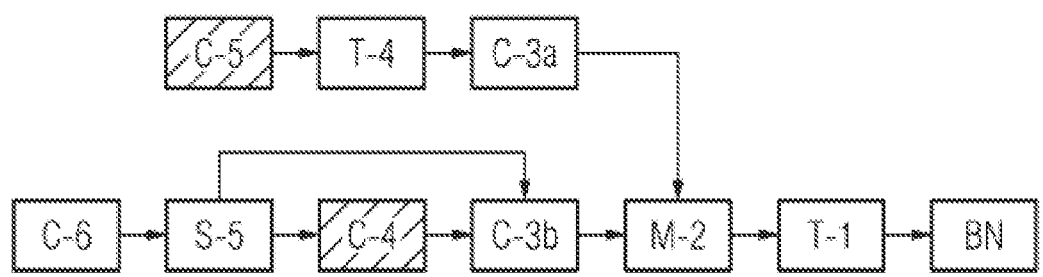
FIG. 2 shows the schematic illustration of an industrial automation arrangement having concatenated automation components in accordance with the invention.

FIG. 2 structurally shows an automation arrangement, such as a filling plant. The arrows signify material flows. The bottleneck BN is that component that limits the plant performance, such as a packaging device. Further automation components, for example, conveyor belts T-1, T-4, units for merging the material M-2, units for splitting the material flow S-5 and general assemblies C-3a, C-3b, C-4, C-5, are arranged upstream and/or downstream (not illustrated) of the bottleneck BN. In the exemplary illustrated case, there is starvation, i.e., a shortage of material, at the bottleneck BN. The numbers in the reference signs indicate how far in the "upstream" direction (upstream material flow) the automation components or generally elements are relative to the bottleneck BN.

A technical problem (inherent fault), a shortage of material in the incoming material (starvation) or a blocked material output (tailback) are fundamentally possible as reasons for the stoppage of a component. In addition, there are components in which a disruption without an inherent fault can occur only as a result of the interaction of a plurality of external conditions. Examples are material merges and material splits in which an external disruption (shortage, tailback) is sometimes also "required" at two or more input/output nodes in order to be able to declare a stoppage without an inherent disruption. This results in the requirement for a "memory" for performing an RCA, i.e., it does not suffice to initiate an independent analysis for all connected components. Rather, it is necessary to find a possible way of being able to combine the results from the analysis of different "paths", even if the RCA is performed in a decentralized manner. This occurs here at that component at which material flows merge in the case of "starvation" or material flows split in the case of a "tailback".

In order to automatically determine the plant structure outlined in FIG. 2, the components (for example, machines, and/or conveyor belts) that are directly connected ("concatenated") to one another in the material flow use the communication channels (automation data network) available to them to communicate their existence to one another. For this purpose, all components that are integrated in the analysis have a computing unit that can both perform the analysis and provide the required communication interfaces. The programmable logic controllers that are already present in the individual stations anyway or separate computers may be used as the computing unit or "platform". For communication, it is possible to respectively use an already existing data line or a communication connection implemented for this purpose.

In the present example, such self-discovery is performed using communication channels configured for this purpose. In this case, a communication interface that directly connects the components involved in the material flow to one another is assigned to each interface that is used to effect the material flow. Each component therefore knows the components to which it is connected in terms of material flow in the plant and which communication interface can be used to send requests to adjacent components. In an alternative method, a specially marked product (for example, a bottle provided with an RFID tag), which can be captured by all available components, is introduced into the material flow. As soon as this product arrives at a component, this component reports the arrival of the marked product, together with a unique ID for the component and possibly time information (time stamp), in a broadcast to all other components. The plant structure with respect to the material flow results directly from the order in which the arrival of the marked product is reported by the components, and each component can determine the components connected to it.

The methods described by way of example also make it possible for each component to determine the direction in which, i.e., via which directly connected adjacent component, the material flow reaches the bottleneck or via which adjacent component the material flows away. After the discovery phase, the logical overall structure of the plant exists in a sufficient form for an RCA and a fault prediction (early warning) implicitly between the machines involved; this knowledge is kept distributed among the automation components. If the plant structure changes during ongoing operation, it is not necessary to create a new plant model; an automatic update is performed with the aid of the same mechanism that was used to generate the original plant model.

The RCA calculation is based substantially on the processing of state information relating to the machines of the production plant, for example, machine is operating normally, has a technical defect, is at a standstill on account of a lack of input material (starvation) or is at a standstill on account of a blocked output channel (tailback). More generally, other machine key figures (for example, throughput) can also be concomitantly taken into account. These may also be master data in the individual case (for instance, the start-up time after a stoppage), in particular when measurements are not yet available for this. In the illustrated concept of a decentralized implementation of the RCA calculation, all data are also preferably held locally on the machines.

Each machine is intended to "remember" its state history for a certain period. There is not necessarily an external database or an external central computer which is responsible for the calculation. Consequently, all data required for the calculation must be held and updated in the machines or the local computing units.

The starting point for an RCA is always the stoppage of the/a bottleneck assembly. The machine itself knows the direction (material inflow or outflow; starvation or tailback) from which the problem arises. As a result, it knows which machine or, in the case of branches, which machines must "respond" to it in order to ultimately arrive at the causative machine.

Figure 3:
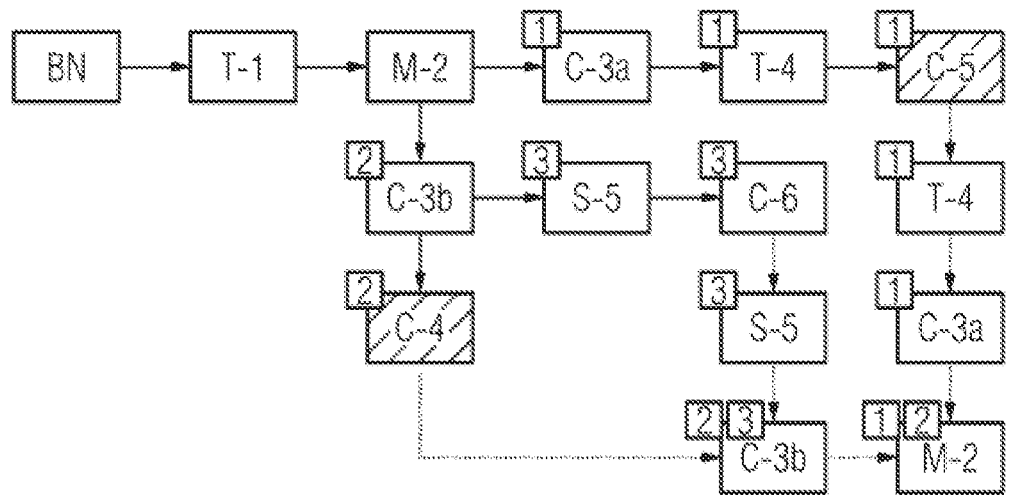
FIG. 3 shows the propagation of interrogation and response messages in the arrangement of FIG. 2 starting from a bottleneck assembly.

An example of the resulting message traffic is indicated in FIG. 3. The example relates to the structure illustrated in FIG. 2.

There is a communication path (from the determination of the plant structure). Consequently, the bottleneck BN may contact the machine (here: conveyor belt) T-1 ("upstream", i.e., counter to the material flow path) in the event of a shortage of material, may provide it with its own current key figures relevant to this situation and may hand over responsibility for initiating all necessary further steps.

In the component T-1, a check is then performed to determine whether there were inherent disruptions that caused the bottleneck stoppage in a time window resulting from its own key figures and possibly the key figures of the previous component, i.e., for example, a stoppage of the conveyor belt within the last 60 seconds for a duration of >5 seconds.

If not, the component T-1 will contact the component M-2 and so on. Finally, the machine causing the bottleneck stoppage will be able to be identified, as in a conventional RCA, and is displayed on the plant using appropriate means. In this case, SCADA data points, an HMI panel, and/or warning lights are conceivable. The important factor is that all key figures must be located only in the machines themselves and every calculation takes place in the machines themselves.

In the present example, it shall be assumed that the components C-5 and C-4 are responsible for the bottleneck stoppage, in which case both components each do not provide their nominal performance in separate branches of the plant upstream of the component M-2 and in total do not have sufficient throughput to supply the bottleneck BN with material.

FIG. 3 illustrates the paths of the search messages (solid arrows) and of the associated result feedback (dotted arrows) for the decentralized RCA. The messages each consist of a unique token with a result; in this case, it is unimportant whether the token also has storage space for results or intermediate results or whether these results are appended to the respective token. In the case of plants without branches, the token itself is of minor importance and may also be dispensed with in the individual case, but the token or another unique identification is important in branched systems in order to combine messages and their results from different branches.

In the illustration, numbers 1, 2 or 3, which illustrate the result respectively linked to the token for an incoming message, are noted at the top left of the components. Whereas, in practice, the respective result generally also describes specific performance figures and their origin, for example "C-6: Throughput; 80%-1000 per hour; failure: neg.", in which case an absolute identification would be included here in practice instead of or in addition to the relative item "C-6", a distinction is made only between 3 states within the scope of the example shown here for the purpose of simplification: 1: "Token with an undefined result"; 2: "Token with a result: section is at least partially responsible"; 3: "Token with a result: section bears no responsibility".

On the basis of its own topology investigations, each component has knowledge of adjacent components and therefore also information relating to which connected components should be queried for the current bottleneck stoppage. Components that must follow a plurality of sections provide said sections with a "token". These tokens contain the following information:—token ID (unique numerical value, for example, GUID—device identification number)—current search state (in the state depicted, starvation of the bottleneck would have been passed on here at M-2)—space for the response of a downstream assembly. If, in the case of M-2 upstream (i.e., counter to the direction of material flow), an assembly that can declare the starvation of at least one of the two sections is discovered, it registers itself at this point with a unique ID. The "merge", i.e., the component in which the separate material flows merge, can then decide whether all sections declare the state that is present and can conclude therefrom whether one or more assemblies that have provided corresponding feedback are valid root cause candidates.

FIG. 3 illustrates the course of the messages. The message path of the tokens in the search direction is indicated using solid arrows in this case, whereas the path of the feedback is visualized using dotted arrows.

The sequence of the search in the example shown is the following: the search occurs linearly until the component M-2; no tokens are required. A requirement of the component M-2 is that both paths must be disrupted to declare a disruption at component M-2. Therefore, the component M-2 generates independent tokens for the two subsequent paths in order to be able to subsequently check whether the sum of the results can declare a disruption. The token with the reference sign 1 (illustrated at the top left of the component) is forwarded linearly to C-5; there is an inherent disruption at this component.

The result is passed back to the component M-2 again in the same way. The token with the reference sign 2 first of all reaches the component C-3b; this process occurs in parallel with the sending of the first token 1. Although this component C-3b is connected to two components C-4, S-5 via the split S-5, at least one disrupted path reaches it as a declaration. A new token 3 is generated and is passed to component C-6 via component S-5. There is no disruption at component C-6. The component C-6 is the last component. Accordingly, the token 3 is marked as not responsible and is passed back to component C-3b. In a parallel manner, the token 2 is passed to the component C-4. There is an inherent disruption there. This is noted in the token 2 or the message marked therewith and the message with this token is passed to the component C-3b. At component C-3b, it is determined that at least one section is disrupted (C-4, communicated with token 2) and this result is passed to the component M-2. The two tokens 1 and 2 and the messages forwarded therewith at least in total declare the stoppage because it is clear, for example, from the messages from the two branches that the required amount of material is not conveyed in total. The components noted with the tokens can be considered to be "root causes", i.e., originators of the disruption.

The functions needed for the described method and their basic parameters can each be planned, for example, as a PLC functional module in the assemblies or components, i.e., may already be provided at the time at which the plant is planned.

A fault prediction, an "early warning", is likewise possible by virtue of the method described here; it is not only initiated by the bottleneck BN, but rather by all other assemblies or components that determine an inherent fault. As a result of the dynamic "self-discovery" of the plant structure, each assembly ideally knows the direction of flow of the bottleneck, i.e., the assembly critical for throughput, and therefore also the direction in which the early warning analysis must run. If this knowledge is not available for whatever reasons, a machine which changes or will change to a stoppage, can also report this fact in all directions of flow.

In comparison with conventional performance of the RCA (central), the algorithms are now executed in a manner distributed among a plurality of computing units. The method presented for decentralized coordination of the determination of the topology and for executing the actual RCA algorithms (including early warning) results in the following advantages, specifically a "plug&play" of the RCA (i.e., a self-configuration) and the possibility of an early warning (EW).

As a result of the dynamic self-discovery of the components of the plant, it is no longer necessary to manually model the plant structure. As a result, the RCA can be used immediately. In the event of dynamic reconfiguration of the plant (for example, by shifting, adding or removing a component), the selected method for the self-discovery of the plant structure can be performed locally again. As a result, the RCA is immediately ready for use again after the reconfiguration.

Figure 4:
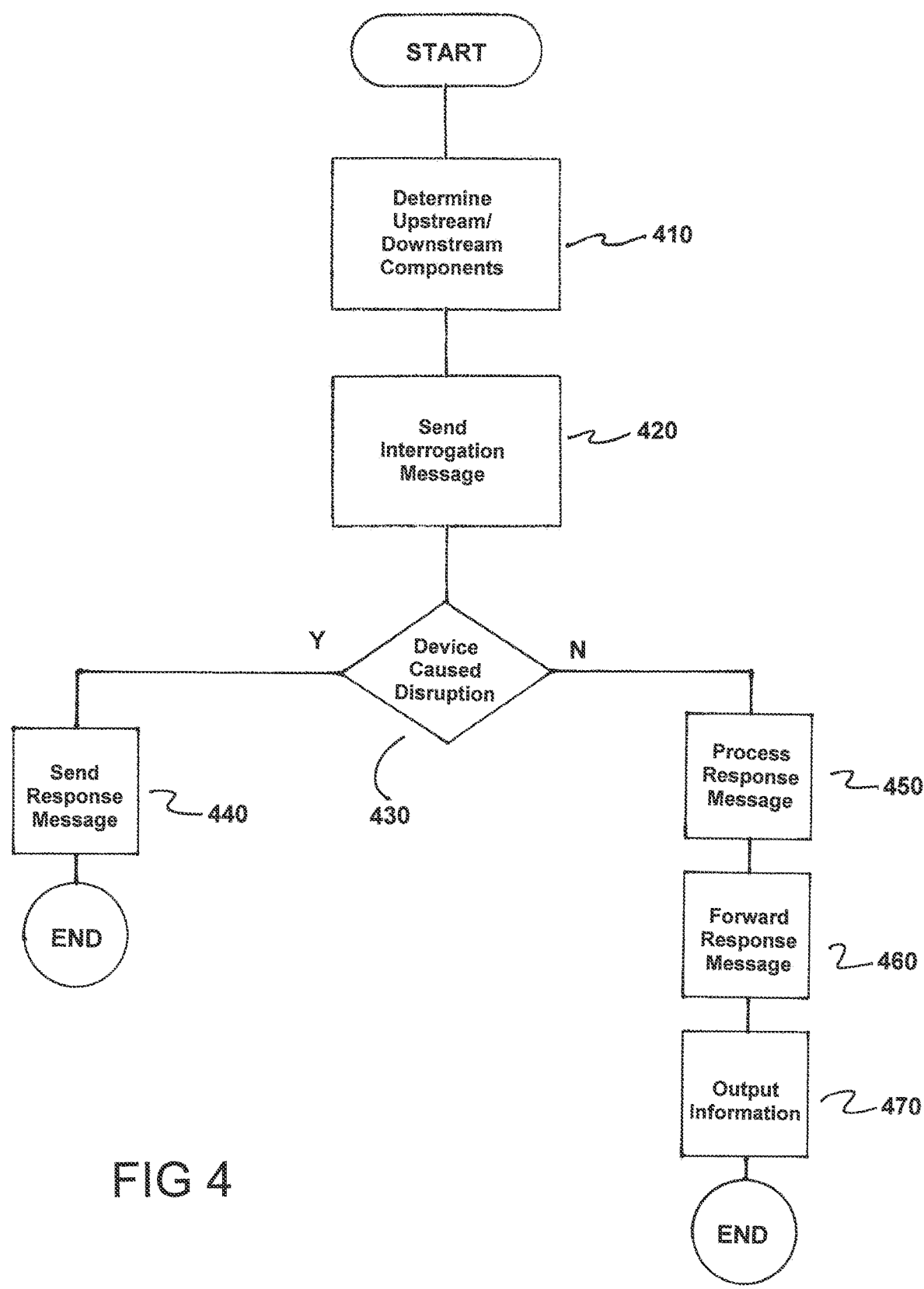
FIG. 4 is a flowchart of the method in accordance with the invention.

The data relevant to the RCA can be evaluated locally on or close to (close in terms of data technology or spatially close) the components. All component-specific data are available here. There is no need to report these data (for example, continuous flow data) to a superordinate system. The available computing power and the storage capacity, which are required overall for the analyses, are expanded automatically and linearly using added components. That is, the RCA is automatically also scaled with a growth of an automation arrangement. FIG. 4 is a flowchart of the method for identifying a process-disrupting automation component BN, . . . , C-6 in an industrial automation arrangement having a plurality of concatenated automation components BN, . . . , C-6, where a process disruption is determined in a first of the automation components BN and is examined in the a first of the automation components BN by a first local analysis device.

The method comprises determining, during a first step, by each automation component BN, . . . , C-6 determines at least one automation component BN, . . . , C-6 arranged upstream in the concatenation and/or at least one automation component BN, . . . , C-6 arranged downstream in the concatenation, as indicated in step 410.

Next, during a second step, the first automation component BN sends an interrogation message to at least one second automation component BN, . . . , C-6 that is arranged upstream or downstream in the concatenation depending on a type of process disruption, as indicated in step 420.

Next, during a third step, a local analysis device of the second automation component BN, . . . , C-6 takes locally stored or measured key figures as a basis for deciding whether this second automation component BN, . . . , C-6 has caused the process disruption.

In accordance with the method of the invention, if the second automation component BN, . . . , C-6 has caused the process disruption then, during a fourth step, a response message is sent to the first automation component BN, as indicated in step 430.

In accordance with the method of the invention, if the second automation component BN, . . . , C-6, on the other hand, has not caused the process disruption then, during a fifth step, the second automation component BN, . . . , C-6 recursively sends the same interrogation message or a further interrogation message to at least one third automation component BN, . . . , C-6 arranged upstream or downstream of the second automation component BN, . . . , C-6 and analogously processes the same interrogation message or the further interrogation message at the at least one third automation component BN, . . . , C-6, as indicated in step 440.

Next, during a sixth step, a response message received is respectively forwarded by an automation component BN, . . . , C-6 to that automation component BN, . . . , C-6 from which the automation component BN, . . . , C-6 receiving the response message received the associated interrogation message, as indicated in step 450.

Next, during a seventh step, the first automation component BN definitively receiving the response message provides or outputs, based on the content of the response message, information relating to the automation component BN, . . . , C-6 that caused the process disruption, as indicated in step 460.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for identifying a process-disrupting automation component in an industrial automation arrangement having a plurality of concatenated automation components, a process disruption being determined in a first of the automation components and being examined in a first of the automation components by a first local analysis device, the method comprising:

determining, during a first step, by each automation component, at least one of (i) at least one automation component arranged upstream in the concatenation and (ii) at least one automation component arranged downstream in the concatenation;

sending, during a second step, by the first automation component, an interrogation message to at least one second automation component which is arranged upstream or downstream in the concatenation depending on a type of process disruption; and taking, during a third step, by an analysis device of the second automation component, stored or measured key figures as a basis for deciding whether this second automation component has caused the process disruption;

wherein, if the second automation component has caused the process disruption, the method further comprises:

sending, during a fourth step, a response message to the first automation component; and wherein, if the second automation component has not caused the process disruption, the method further comprises:

repetitively sending, during a fifth step, by the second automation component, the same interrogation message or a further interrogation message to at least one third automation component arranged upstream or downstream of the second automation component and processing the same interrogation message or the further interrogation message at the at least one third automation component;

forwarding respectively, during a sixth step, a response message received by an automation component to that automation component from which the automation component receiving the response message received the associated interrogation message; and providing or outputting, during a seventh step, by the first automation component definitively receiving the response message, based on the content of the response message, information relating to the automation component which caused the process disruption.

2. The method as claimed in patent claim 1, wherein an automation component of the automation components, a performance of which determines or limits performance of the entire automation arrangement, is determined as the first automation component.

3. The method as claimed patent claim 1, wherein, during the first step, the automation component arranged upstream and/or the automation component arranged downstream is/are determined based on data channels or based on material input interfaces and/or material output interfaces of this automation component.

4. The method as claimed in patent claim 1, wherein, during the first step, the automation component arranged upstream and/or the automation component arranged downstream is/are determined based on a test body running through the automation arrangement.

5. The method as claimed in patent claim 1, wherein, in an event of a branch in which a plurality of automation components are arranged upstream or downstream in the concatenation, a plurality of parallel interrogation messages are sent in the second step; and wherein the corresponding plurality of response messages are combined to form a common response message in the automation component sending the parallel interrogation messages.

6. The method as claimed in patent claim 1, wherein, if the interrogation message reaches a last one of the automation components in the concatenation, this is responded to with a response message in the opposite direction of the concatenation.

7. The method as claimed in patent claim 1, wherein, if a cause of a process disruption can be foreseen for the future based on local key figures, an analysis device of one of the automation components sends an early warning message to at least one of the adjacent automation components.

8. The method as claimed in patent claim 1, wherein the interrogation messages and the response messages each comprise a unique token at least in the event of branches.

9. The method as claimed in patent claim 1, wherein, if the topology of the industrial automation arrangement changes, at least the first step is re-performed on each of the automation components.

10. A system having an automation component for operation in an industrial automation arrangement having a plurality of concatenated automation components, wherein the automation component includes an analysis device which is configured to:

determine at least one of (i) at least one automation component arranged upstream in the concatenation and (ii) at least one automation component arranged downstream in the concatenation;

send an interrogation message to at least one second automation component which is arranged upstream or downstream in the concatenation depending on a type of process disruption;

if the analysis device receives an interrogation message, to take stored or measured key figures as a basis for deciding whether this automation component has caused the process disruption;

wherein, if this automation component has caused the process disruption, then a response message is sent to the interrogating automation component; and wherein, if this automation component has not caused the process disruption, the automation component is configured to:

send the same interrogation message or a further interrogation message to at least one other automation component which is arranged upstream or downstream of it;

respectively forward a received response message to that automation component from which the automation component received an associated interrogation message, and if this automation component was an original sender of the interrogation message, the automation component being further configured to:

provide or output, based on the content of the associated response message, information relating to the automation component of the automation components which caused the process disruption.

* * * * *